US012710125B2

(12) United States Patent
Palmer et al.

(10) Patent No.: US 12,710,125 B2
(45) **Date of Patent: *Aug. 18, 2026**

(54) INSULATING SUPPORT BRACKET FOR JACKETED PIPE SYSTEM

(71) Applicant: ASC ENGINEERED SOLUTIONS, LLC, Exeter, NH (US)

(72) Inventors: Matthew Ryan Palmer, Riverside, RI (US); Jon Sojka, Warwick, RI (US)

(73) Assignee: ASC ENGINEERED SOLUTIONS, LLC, Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/795,626

(22) Filed: Aug. 6, 2024

(65) Prior Publication Data

US 2025/0216018 A1 Jul. 3, 2025

Related U.S. Application Data

(63) Continuation of application No. 18/197,310, filed on May 15, 2023, now Pat. No. 12,055,264, which is a continuation of application No. 17/669,065, filed on Feb. 10, 2022, now Pat. No. 11,686,422, which is a continuation of application No. 16/878,477, filed on May 19, 2020, now Pat. No. 11,280,443.

(51) Int. Cl.

| | |
|---|---|
| ***F16L 59/135*** | (2006.01) |
| ***F16L 3/12*** | (2006.01) |
| ***F16L 59/14*** | (2006.01) |

(52) U.S. Cl.

CPC ............... *F16L 59/135* (2013.01); *F16L 3/12* (2013.01); *F16L 59/14* (2013.01)

(58) Field of Classification Search

CPC . F16L 59/135; F16L 59/14; F16L 3/12; F16L 3/137; F16L 3/223; F16L 3/233; F16L 3/24; F16L 3/243; F16L 3/31; F16L 3/245; H02G 3/22; H02G 3/30

See application file for complete search history.

(56) References Cited

U.S. PATENT DOCUMENTS

| | | | | |
|---|---|---|---|---|
| 896,333 A * | 8/1908 | Smith | ..................... | F16L 41/06 285/376 |
| 982,028 A * | 1/1911 | Austin | .................... | F16L 41/12 24/19 |
| 1,903,029 A * | 3/1933 | Damsel | .................. | F16L 21/06 285/373 |
| 2,720,016 A * | 10/1955 | Johannsen | ................ | F16L 3/24 248/230.9 |

(Continued)

*Primary Examiner* — Nkeisha Smith

(74) *Attorney, Agent, or Firm* — McAndrews Held & Malloy, Ltd.

(57) ABSTRACT

A saddle for an insulating support bracket includes an arcuate central portion defining a first end and a second end opposite the first end, at least one vent formed through the arcuate central portion; a first flange portion bent radially inward from the arcuate central portion at the first end, a first fastener hole formed through the first flange portion, wherein the first fastener hole is accessible through the at least one vent; and a second flange portion bend radially inward from the arcuate central portion at the second end, a second fastener hole formed through the second flange portion, wherein the second fastener hole is accessible through the at least one vent.

20 Claims, 5 Drawing Sheets

(56) References Cited

U.S. PATENT DOCUMENTS

| | | | | | |
|---|---|---|---|---|---|
| 2,733,034 | A * | 1/1956 | Tormo | F16L 3/24<br>248/229.21 |
| 3,494,641 | A * | 2/1970 | Caregnato | F16L 37/20<br>285/364 |
| 4,121,796 | A * | 10/1978 | Forbes | F16L 3/11<br>248/62 |
| 7,364,323 | B2 * | 4/2008 | Francois | F21V 21/04<br>248/62 |
| 7,603,752 | B2 * | 10/2009 | Heath | F16L 33/20<br>24/20 R |
| 8,313,065 | B2 * | 11/2012 | Birch | F16L 3/1016<br>248/65 |
| 9,739,410 | B2 * | 8/2017 | Skinner | F16L 21/04 |
| 9,765,906 | B2 * | 9/2017 | Skarnes | F16L 55/17 |
| 11,692,664 | B2 * | 7/2023 | Dodge | F16L 59/135<br>138/107 |
| 2007/0063514 | A1 * | 3/2007 | Noda | F16L 17/04<br>285/112 |
| 2021/0364120 | A1 * | 11/2021 | Palmer | F16L 59/14 |
| 2022/0274541 | A1 * | 9/2022 | Velázquez | B60R 16/00 |

* cited by examiner

INSULATING SUPPORT BRACKET FOR JACKETED PIPE SYSTEM

CROSS-REFERENCE TO RELATED APPLICATIONS

The present application is a continuation of U.S. application Ser. No. 17/669,065, filed Feb. 10, 2022, which is a continuation of U.S. application Ser. No. 16/878,477, filed May 19, 2020, which issued as U.S. Pat. No. 11,280,443 on Mar. 22, 2022, each of which is hereby specifically incorporated by reference herein in its entirety.

TECHNICAL FIELD

This disclosure relates to piping. More specifically, this disclosure relates to piping insulation.

BACKGROUND

In various applications of various industries, piping can require insulation. In various aspects, insulation can be implemented around a pipe. While various insulation methods and implementations exist in the various fields, there remains a need for structural piping insulation that is not especially fragile but maintains temperature of extremely hot or extremely cold fluids or other transported substrate media.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulating support bracket including a plurality of standoffs, each standoff being formed of rigid insulating material; a plurality of saddles, each saddle being formed of a rigid material, each saddle being fastened to at least one standoff.

Also disclosed is a jacketed pipe system including an inner pipe, the inner pipe being of an outer diameter $d_1$ and being hollow; an insulating support bracket itself including a plurality of standoffs, each standoff being formed of rigid insulating material; a plurality of saddles, each saddle being formed of a rigid material, each saddle being fastened to at least one standoff, the insulating support bracket being formed into a ring and surrounding the inner pipe; and an outer pipe, the outer pipe being of an inner diameter $d_2$ and being hollow and surrounding the insulating support bracket and the inner pipe.

Also disclosed is a method of forming a jacketed pipe assembly including the steps of obtaining an inner pipe, the inner pipe being of an outer diameter $d_1$ and being hollow; obtaining a plurality of standoffs and a plurality of saddles; arranging the plurality of standoffs and the plurality of saddles abutting the outer diameter $d_1$ and surrounding the inner pipe; fastening at least one standoff to at least one saddle to form a ring, thereby forming an insulating support bracket having an inner diameter $d_i$ and an outer diameter $d_o$; and arranging an outer pipe around the insulating support bracket, the outer pipe having an inner diameter $d_2$, wherein the inner diameter $d_i$ is about the same as the outer diameter $d_1$ and wherein the outer dimeter $d_o$ is about the same as the inner diameter $d_2$.

Disclosed is a saddle comprising an arcuate central portion defining a first end and a second end opposite the first end; a first flange portion bent radially inward from the arcuate central portion at the first end; and a second flange portion bend radially inward from the arcuate central portion at the second end.

Additionally, disclosed is an insulating support bracket comprising a saddle comprising an arcuate central portion and a first flange portion extending radially inward from the arcuate central portion, and a second flange portion extending radially inward from the arcuate central portion; and a first standoff fastened to the first flange portion; and a second standoff fastened to the second flange portion.

Disclosed is a saddle for an insulating support bracket includes an arcuate central portion defining a first end and a second end opposite the first end, at least one vent formed through the arcuate central portion; a first flange portion bent radially inward from the arcuate central portion at the first end, a first fastener hole formed through the first flange portion, wherein the first fastener hole is accessible through the at least one vent; and a second flange portion bend radially inward from the arcuate central portion at the second end, a second fastener hole formed through the second flange portion, wherein the second fastener hole is accessible through the at least one vent.

Also disclosed is an insulating support bracket comprising a plurality of saddles, each saddle comprising an arcuate central portion, a first flange portion extending radially inward from the arcuate central portion, and a second flange portion extending radially inward from the arcuate central portion; and a plurality of standoffs, each standoff being fastened to the first flange portion of a first adjacent one of the saddles and the second flange portion of a second adjacent one of the saddles; wherein an outer diameter of the insulating support bracket is defined by the arcuate central portions of the plurality of saddles and an inner diameter of the insulating support bracket is defined by the plurality of standoffs.

Additionally, disclosed is an insulating support bracket assembly comprising an insulating support bracket comprising: a plurality of saddles, each saddle comprising an arcuate central portion; and a plurality of standoffs, each standoff being disposed between and fastened to an adjacent pair of the saddles; and a pipe received through the insulating support bracket and defining an outer surface, each of the standoffs abutting the outer surface of the pipe; wherein an arcuate gap is defined between each of the arcuate central portions and the outer surface of the pipe Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
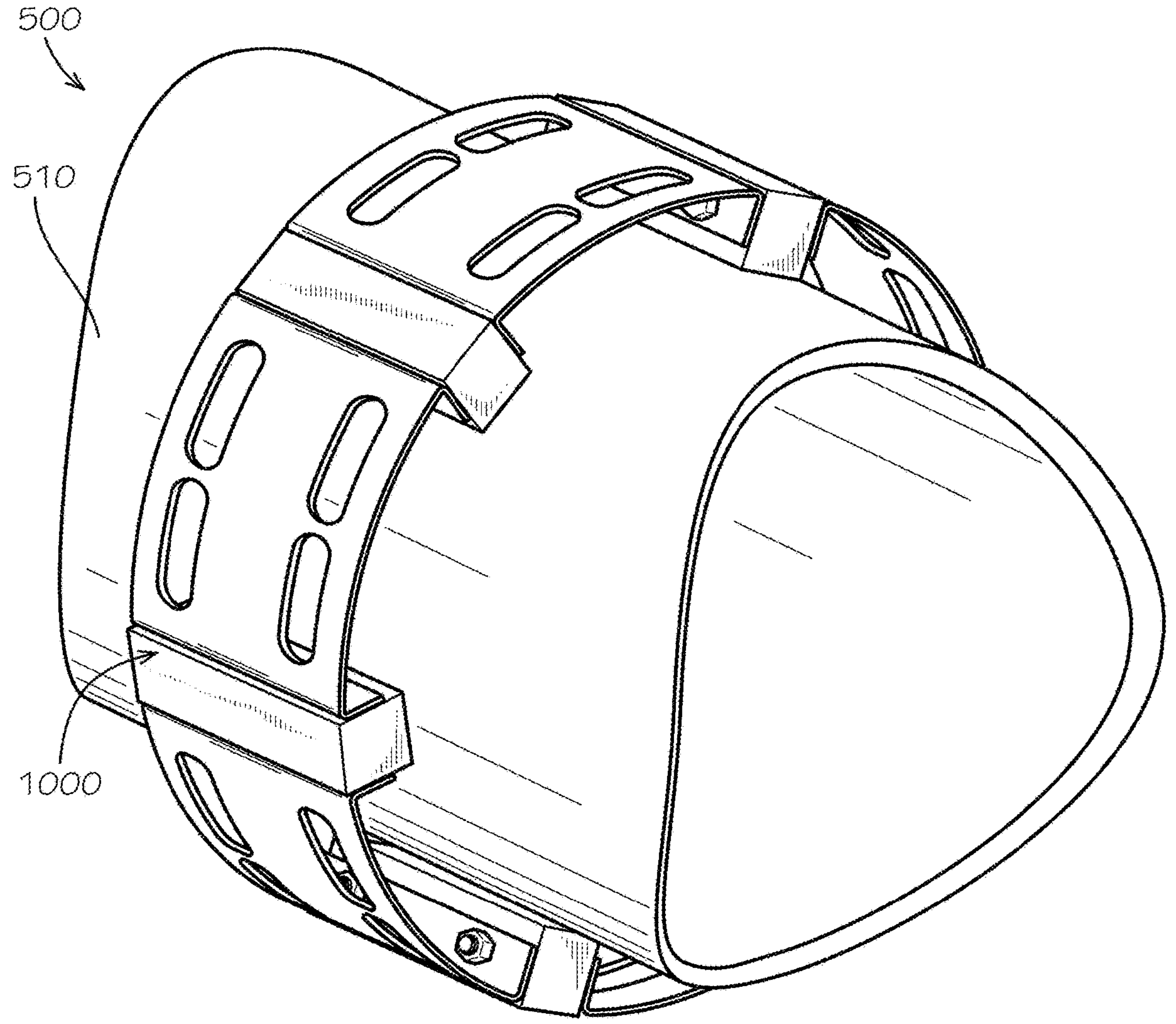
FIG. 1 is a perspective view of one aspect of a jacketed pipe assembly.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a jacketed pipe and associated methods, systems, devices, and various apparatus. The jacketed pipe includes an insulating spacer bracket. It would be understood by one of skill in the art that the disclosed bracket is described in but a few exemplary embodiments among many. No particular terminology or description should be considered limiting on the disclosure or the scope of any claims issuing therefrom.

One embodiment of an insulating spacer bracket 1000—or "spacer"—for use with jacketed pipe is disclosed and described with reference to FIG. 1. The spacer can be utilized to implement jacketed pipe to maintain structural integrity of the jacketed pipe while maintaining insulating properties unique to jacketed pipe.

In multiple applications, temperature-sensitive substrate materials can be required to be transmitted through a pipe or pipeline. In one example, crude oil extracted from the ground can exceed 120° Fahrenheit. In other examples, crude oil or other substrates can exceed 150° Celsius, or over 300° Fahrenheit. Oil pipelines can carry the crude oil from its source to a refinery where it can be refined in oil products such as petroleum. Some of these oil pipelines extend from permafrost regions—such as in the Yukon, Nunavut, and Northwest Territories in Canada—to areas more hospitable to a refinery location. Such a pipeline is undesirable above ground because it is exposed to the weather and because it prevents migration of ground mammals. However, if such a pipeline is buried at temperatures in excess of 100° Fahrenheit, the permafrost no longer maintains its frozen temperatures. Such thawing of the permafrost is environmentally undesirable and can cause sink holes and other structural damage to the pipeline. In another example, liquefied natural gas can be transported through a pipe in a structure. Liquefied natural gas forms at −265° Fahrenheit. At such temperature, insulation of some sort is necessary to prevent the environment surrounding it from affecting the product inside the piping. Other similar examples of temperature-sensitive liquids or gasses include liquid nitrogen (−346° Fahrenheit) or even simply high temperature and pressure water or steam, such as that ejected as exhaust by nuclear reactor coolant systems.

To address these temperature-sensitive applications, insulated pipe can be a helpful solution. For many applications, however, simple insulation can be insufficient to address the needs of temperature maintenance. As such, jacketed pipe can be used as an insulating element to maintain substrate temperature. In a jacketed pipe system, an inner pipe can be nested within an outer pipe. The inner pipe can have an outer diameter that is smaller than an inner diameter of the outer pipe such that an air gap is maintained between the inner pipe and the outer pipe. Depending on the application, the air gap can be of a thickness of several inches or several feet. Ambient air is an effective insulator so long as convection is minimized. As such, the air gap between the inner pipe and the outer pipe in a jacketed pipe system can prevent heat transfer into or out of the substrate from the environment surrounding the jacketed pipe. In various jacketed pipe systems, an insulating material can be utilized to fill the air gap as well, such as a fiberglass, ceramic, or carbon insulation material. In various applications, the air gap can be partially filled by insulation.

With such a system, however, some issues can arise. Especially with heavy pipe and heavy liquids, concentricity of the outer and inner pipe can become compromised. If the inner pipe becomes skewed within the outer pipe, the insulating effect can be minimized, as the outer pipe can in some cases conduct heat directly with the inner pipe. Additionally, in some cases, the inner pipe can carry very heavy substrate materials, thereby causing structural problems in supporting the inner pipe within the outer pipe. In some cases with no load bearing insulation, the inner pipe can become damaged or crack under the weight. In other cases, insulation within the outer pipe can become damaged by the lack of load bearing support, which can lead to leaks in the system, or undesirable heat transfer into or out of the inner carrier pipe.

As seen with reference to FIG. 1, a jacketed pipe system 500 can comprise the insulating spacer bracket 1000. The insulated spacer bracket 1000 can be located around an inner pipe 510 and positioned within an outer pipe (not shown).

Figure 2:
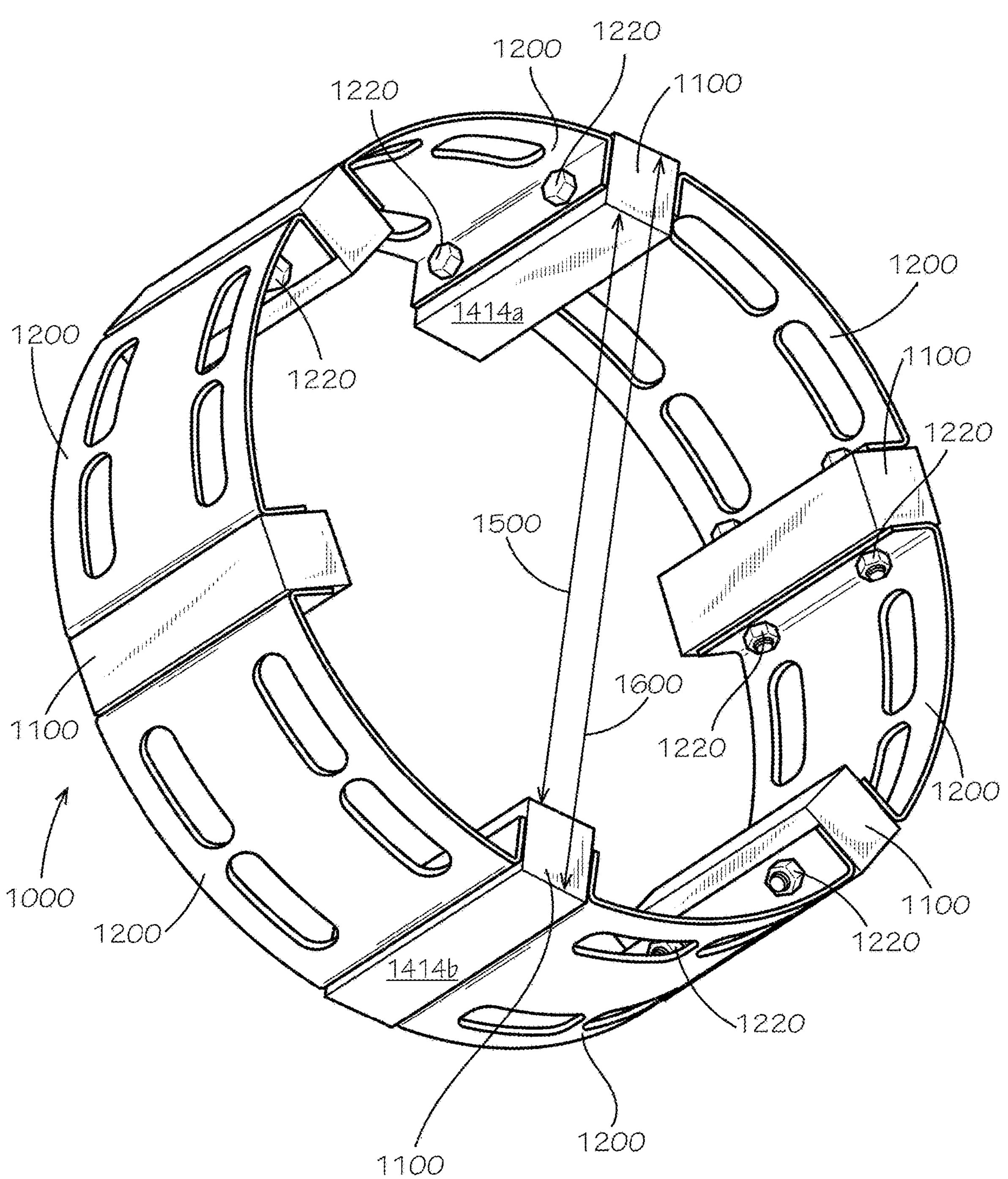
FIG. 2 is a perspective view of an insulating spacer bracket as part of the jacketed pipe assembly of FIG. 1.
Figure 3:
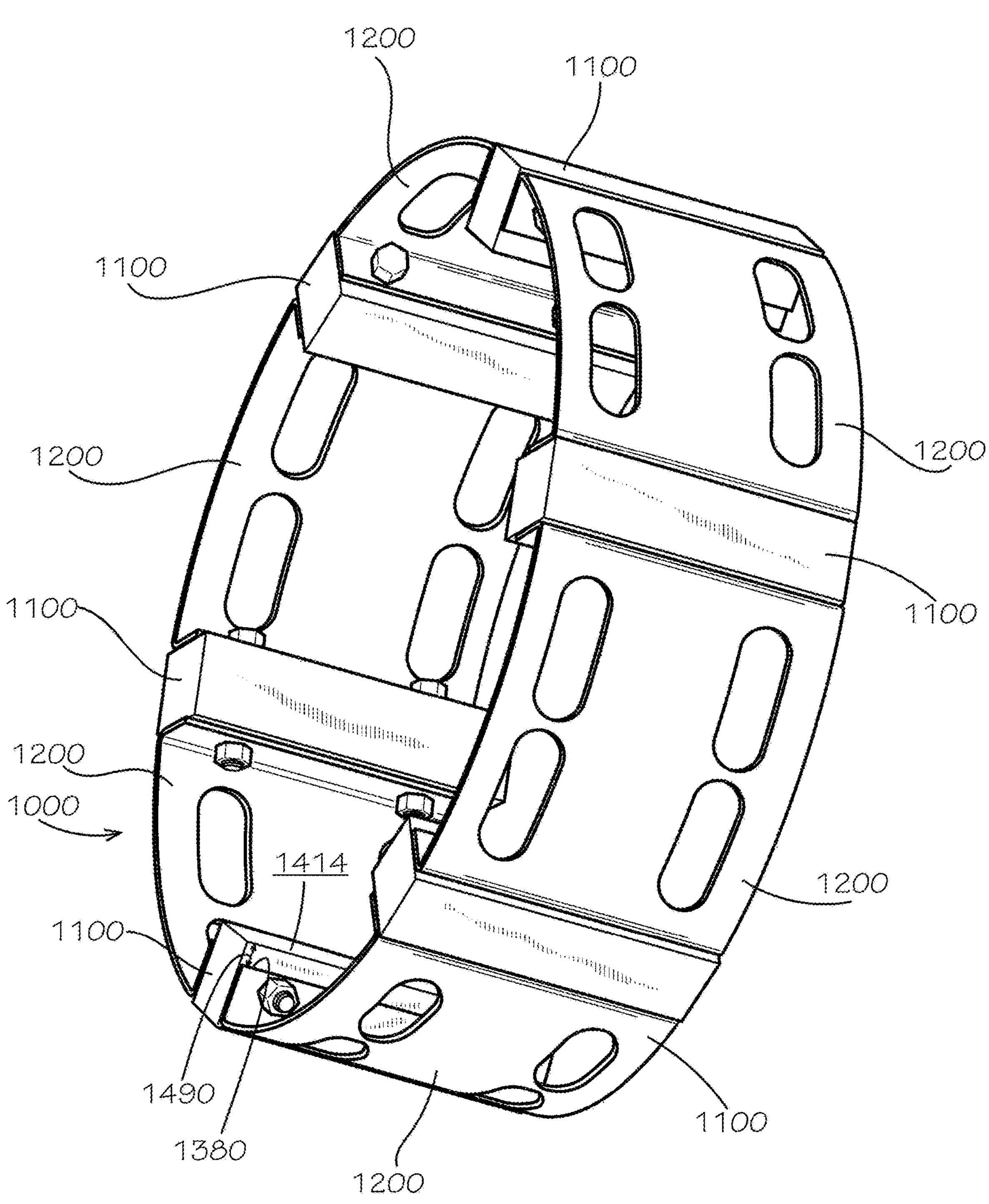
FIG. 3 is another perspective view of the insulating spacer bracket of FIG. 2.

As seen with reference to FIGS. 2-3, the insulating spacer bracket 1000 can in various aspects be an assembly of smaller elements. In various aspects, the insulating spacer bracket 1000 can be a single piece. In various aspects, the insulating spacer bracket 1000 can be a clamshell design, or various other applications as would be understood by one of skill in the art.

In the current aspect, the insulating spacer bracket can comprise a plurality of standoffs 1100. In the current aspect, six standoffs 1100 can be included. In various aspects, more or fewer standoffs 1100 can be included.

In various aspects, the standoffs 1100 can be formed of substantially rigid but also insulating material. In various aspects, each standoff 1100 can be formed from composites such as fiberglass, carbon fiber, linen, canvas, or other materials in resin. In various aspects, each standoff 1100 can be formed of wood, phenolic, polymer, or other various materials suitable to the application. In one aspect, each standoff 1100 can be formed of high density polyurethane or high density polyurethane foam. One suitable high density polyurethane can be CoraFoam®. In one aspect, each standoff 1100 can be formed of composites of linen, canvas, paper, fiberglass, carbon fiber or other fabric in a thermosetting plastic. Micarta® can be one such suitable material. Micarta® can comprise cellulosic material such as cellulose paper, cotton fabrics, synthetic yarn fabrics, glass fabrics, or unwoven fabric. Micarta® can comprise phenolic, epoxy, silicone, or melamine resin based thermoset materials reinforced with fiberglass, cork, cotton cloth, paper, carbon fiber or other substrates. In one aspect, each standoff 1100 can be formed of Micarta® NP572. In various aspects, Micarta® NP572 can be high strength, medium weave glass fabric with epoxy resin. Micarta® NP572 can maintain dimensional stability and high strength even with temperatures over 150° C. Micarta® NP572 can, in various aspects, comprise the material properties indicated below.

Material Properties Chart of Micarta ® NP572

| Physical Properties | Metric | English | Comments |
|---|---|---|---|
| Specific Gravity | 1.89 g/cc @ thickness 12.7 mm | 1.89 g/cc @ thickness 0.500 in | ASTM D792 |
| Moisture Absorption | 0.200% @ thickness 1.57 mm | 0.200% @ thickness 0.062 in | ASTM D570 Condition A |
| **Mechanical Properties** | **Metric** | **English** | **Comments** |
| Rockwell Hardness | 108 @ thickness 6.35 mm | 108 @ thickness 0.250 in | ASTM D785 |
| Tensile Strength | 241 MPa @ thickness 3.17 mm | 35000 psi @ thickness 0.125 in | ASTM D638 Condition A-crosswise |
| | 326 MPa @ thickness 3.17 mm | 47300 psi @ thickness 0.125 in | ASTM D638 Condition A-lengthwise |
| Flexural Strength | 365 MPa @ thickness 1.57 mm | 53000 psi @ thickness 0.0620 in | CrossWise; ASTM D790 Condition A |
| | 472 MPa @ thickness 1.57 mm | 68500 psi @ thickness 0.0620 in | Length Wise; ASTM D790 Condition A |

-continued

| Material Properties Chart of Micarta ® NP572 | | | |
|---|---|---|---|
| Compressive Strength | 497 MPa @ thickness 12.7 mm | 72100 psi @ thickness 0.500 in | Flatwise; ASTM D695 Condition A |
| Shear Strength | 174 MPa @ thickness 1.57 mm | 25200 psi @ thickness 0.0620 in | perpendicular; ASTM D732 Condition A |
| Izod Impact, Unnotched | 5.50 J/cm @ thickness 12.7 mm | 10.3 ft-lb/in @ thickness 0.500 in | CrossWise; ASTM D256 Condition E-48/50 |
| | 6.67 J/cm @ thickness 12.7 mm | 12.5 ft-lb/in @ thickness 0.500 in | Length Wise; ASTM D256 Condition E-48/50 |
| Electrical Properties | Metric | English | Comments |
| Dielectric Constant | 4.1 @Thickness 1.57 mm, Frequency 1.00e+6 Hz | 4.1 @Thickness 0.0620 in, Frequency 1.00e+6 Hz | ASTM D150 Condition D-24/23 |
| Dielectric Strength | 26.8 kV/mm @Thickness 1.57 mm | 680 kV/in @Thickness 0.0620 in | ASTM D149 Condition A |
| | 29.9 kV/mm @Thickness 1.57 mm | 760 kV/in @Thickness 0.0620 in | ASTM D149 Condition D-48/50 |
| Dielectric Breakdown | 69000 V @Thickness 1.57 mm | 69000 V @Thickness 0.0620 in | ASTM D149 Condition A |
| Dissipation Factor | 0.018 @Thickness 1.57 mm, Frequency 1.00e+6 Hz | 0.018 @Thickness 0.0620 in, Frequency 1.00e+6 Hz | ASTM D150 Condition D-24/23 |
| Arc Resistance | 185 sec @Thickness 3.17 mm | 185 sec @Thickness 0.125 in | ASTM D495 Conition A |
| Thermal Properties | Metric | English | Comments |
| Transformation Temperature, Tg | 180° C. @Thickness 12.7 mm | 356° F. @Thickness 0.500 in | DMA |
| Flammability, UL94 | V-0 @Thickness 1.57 mm | V-0 @Thickness 0.0620 in | |
| Descriptive Properties | | | |
| Bonding Strength | | 1800 | [lb]; 0.5"; ASTM D229 Condition D-48/50 |

In various aspects, carbon fiber or fiberglass laminates can also be utilized to form each standoff 1100. In various aspects, varying materials can be combined to form standoffs 1100 having various thermal or electrical insulating and structural properties In the current aspect, each standoff 1100 can be about rectangular in shape. In various aspects, each standoff 1100 can be contoured to the curvature of the inner pipe 510. In various aspects, various other shapes can be suitable depending on the application.

In the current aspect, each standoff 1100 can be joined, affixed, or fastened to at least one saddle 1200. In the current aspect, a plurality of saddles 1200 can be fastened to the plurality of standoffs 1100 to form a ring-shaped insulating spacer bracket 1000. Each saddle 1200 can be substantially curved thereby connecting the rectangular standoffs 1100 in a curved or circular arrangement. Each saddle 1200 can be fastened to at least one standoff 1100 by at least one fastener 1220. In the current aspect, each standoff 1100 can be fastened to a pair of saddles 1200 by a pair of fasteners 1220. In the current aspect, each fastener 1220 can be a bolt and nut assembly. In various aspects, each fastener 1220 can be a threaded fastener to join directly to the standoff 1100. In various aspects, adhesives, key/fit arrangements, or other joining elements can be utilized as fasteners 1220 as would be understood by one of skill in the art.

Figure 4:
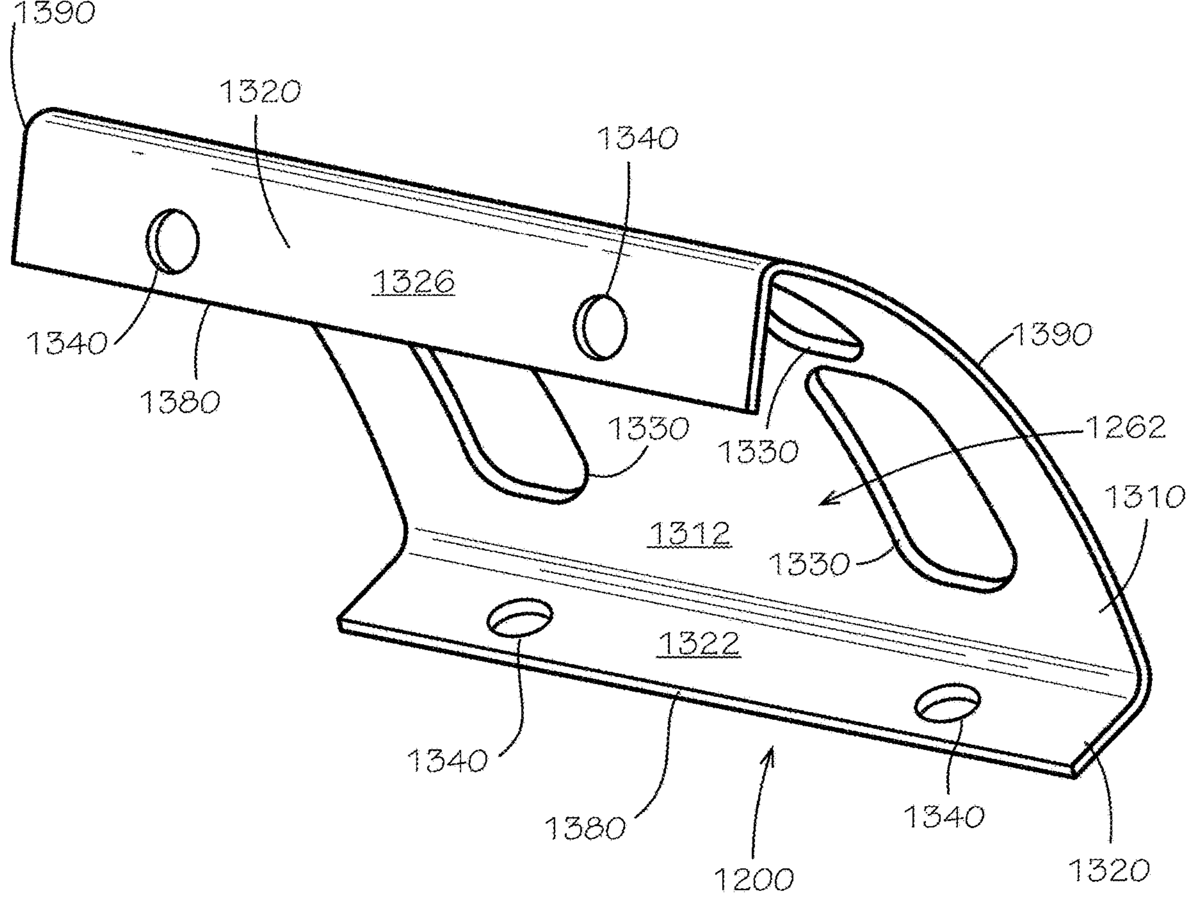
FIG. 4 is a perspective view of a saddle as part of the insulating spacer bracket of FIGS. 2-3.
Figure 5:
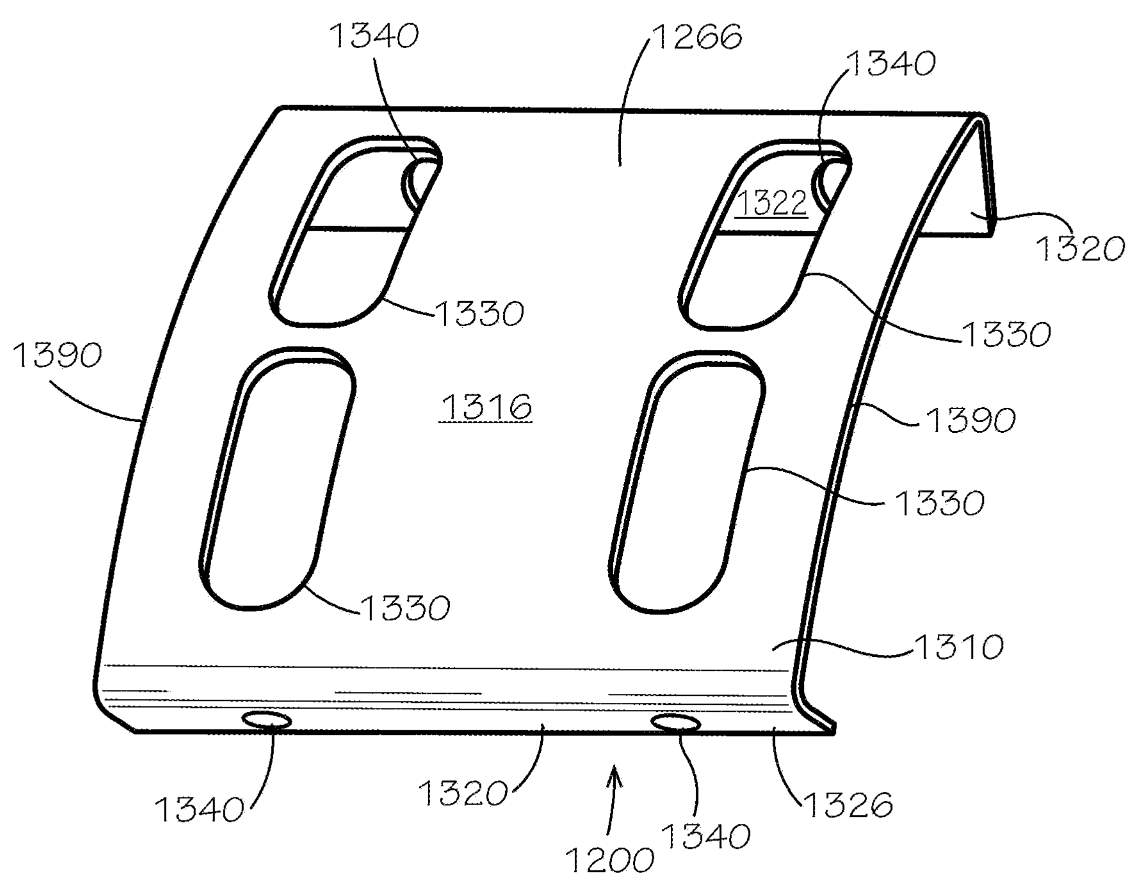
FIG. 5 is another perspective view of the saddle of FIG. 4.

As seen with reference to FIGS. 4-5, each saddle 1200 can comprise a central portion 1310 and at least one flange portion 1320. In the current aspect, each central portion 1310 can be curved to accommodate the inner diameter of the outer pipe (not shown). Each central portion 1310 can define at least one vent 1330. In various aspects, the central portion 1310 can define a plurality of vents 1330. In the current aspect, each central portion 1310 can define four vents 1330. In various aspects, the vents 1330 can provide a variety of purposes. In various aspects, each saddle 1200 can be formed of a strong material, which can be rigid or ductile in various aspects. In various aspects, the saddle 1200 can be formed of metal, composite, or other similar strong materials sufficient to carry the load necessary to hold the substrate and the jacketed pipe without collapsing. In the current aspect, the saddle 1200 can be made of steel, including stainless steels and carbon steels. In the current aspect, the saddle 1200 can be formed of 304 stainless steel. Because steel and other metals can be conductive of heat, vents 1330 can be introduced to reduce contact area with the outer pipe, which can thereby reduce the transmission of heat through the saddle 1200 to the outer pipe. Vents 1330 an also remove material from the saddles 1200, thereby reducing the weight of each saddle 1200 and easing in assembly of the spacer 1000 from the saddles 1200 and standoffs 1100. In the field, the insulating spacer bracket 1000 can be formed around the inner pipe 510 by a field worker, in some aspects. As such, handling the saddle 1200 can be required by hand, and removing weight from the saddle 1200 can be helpful to assembly workers. In the current aspect, vents 1330 can also provide access for a technician to utilize a wrench for tightening fasteners 1220.

Each saddle 1200 can also define a plurality of fastener holes 1340. The fastener holes 1340 can be sized and arranged to accommodate the fasteners 1220. In the current aspect, each flange portion 1320 can define two (2) fastener holes 1340. In various aspects, each flange portion 1320 can be arranged to accommodate different types of fasteners 1220 and can comprise other methods, shapes, or arrangements of features depending on the type of fastener utilized. In various aspects, fastener holes 1340 can comprise a 3-sided element such that bolts can be slid into the holes from the side, thereby allowing the off-site preparation of subassemblies that can be easily connected together in the field. In various aspects, various subassemblies can be connected together using bolts as with the depicted fasteners 1220.

The saddle 1200 can define an inner surface 1262 and an outer surface 1266. The central portion 1310 can define a central portion inner surface 1312 and a central portion outer surface 1316, each being part of the inner surface 1262 and the outer surface 1266, respectively. Similarly, each flange portion 1320 can define a flange portion inner surface 1322 and a flange portion outer surface 1326, each being part of the inner surface 1262 and the outer surface 1266, respectively. Additionally, each flange portion 1320 of each saddle 1200 can define a flange end 1380 that can define an end of the saddle 1200 on one extent. The saddle 1200 can also define a pair of bracket ends 1390 located along the entirety of the saddle 1200, including the central portion 1310 and the flange portion 1320.

Figure 6:
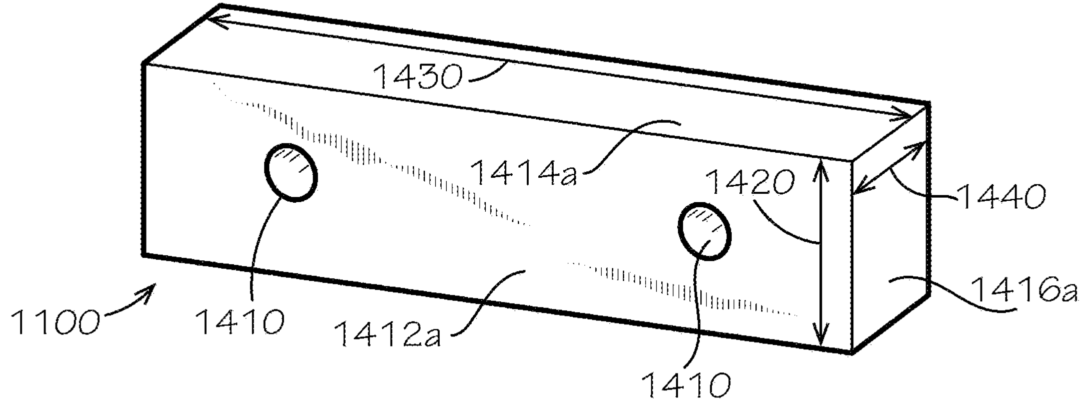
FIG. 6 is a perspective view of a standoff as part of the insulating spacer bracket of FIGS. 2-3.

An isolated view of the standoff 1100 can be seen with reference to FIG. 6. The standoff 1100 can be of rectangular block shape in the current aspect. The standoff 1100 can be about square in cross-section. In various aspects, the standoff 1100 can be of various shapes meant to accommodate a pipeline or manufacturing and assembly requirements. Each standoff 1100 can define at least one fastener hole 1410. In the current aspect, each standoff 1100 can define two (2) fastener holes 1410 for interaction with the fasteners 1220. Each standoff 1100 can comprise lateral faces 1412 (1412*a* shown, 1412*b* on the other side, unseen), contact faces 1414 (1414*a* shown, 1414*b* on the other side, unseen), and end faces 1416 (1416*a* shown, 1416*b* on the other side, unseen). Each standoff 1100 can be described by a height dimension 1420 as measured between the two contact faces 1414, a width dimension 1430 as measured between the two end faces 1416, and a thickness dimension 1440 as measured between the two lateral faces 1412. Each fastener hole 1410 can be arranged as extending entirely through the length of the thickness dimension 1440 from lateral face 1412*a* to lateral face 1412*b*. Each fastener hole 1410 can be positioned about centrally along the height dimension 1420—or, said differently, each fastener hole 1410 in the current aspect can be placed such that a center location of the fastener hole 1410 can be located about one-half the distance of the height dimension 1420 from either of the contact faces 1414. In various aspects, the fastener holes 1410 can be positioned in other locations to accommodate various physical arrangements.

With returning reference to FIG. 4, each fastener hole 1340 can be located close to the flange end 1380 than to the central portion 1310. This arrangement allows the standoff 1100 to protrude below the flange end 1380 such that the standoff 1100 can be the only thing touching the inner pipe 500. In various aspects, the saddle 1200 and the standoff 1100 can be arranged such that the standoff 1100 can be the only thing touching the outer pipe as well with simple dimensional modifications. With returning reference to FIG. 3, a protrusion 1490 of the standoff 1100 can be seen as referenced (annotated with respect to only one of the six standoffs 1100 for clarity). The standoff 1100 can be seen protruding below the flange end 1380 such that the contact face 1414 (inner contact face 1414*a*) can be in contact with an outer surface of the inner pipe 500 (seen in FIG. 1), which can also be excluded from contact with the saddle 1200. The protrusion 1490 can be measured as the distance from the flange end 1380 to the contact face 1414. In the current aspect, the protrusion 1490 can be about one-fourth of the height dimension 1420. In various aspects, the protrusion 1490 can be one-third of the height dimension 1420. In various aspects, the protrusion 1490 can be one-fifth of the height dimension 1420. In various aspects, the protrusion 1490 can be one-half of the height dimension 1420. In various aspects, the protrusion 1490 can be eliminated.

With returning reference to FIG. 2, the plurality of standoffs 1100 can define an inner diameter 1500 of the insulating spacer bracket 1000. The inner diameter 1500 can be defined by the inner contact faces 1414*a*. In the current aspect, the inner diameter 1500 can be defined as the distance between inner contact faces 1414*a* of adjacent standoffs 1100. In aspects that contain an odd number of standoffs 1100, the inner diameter can be defined by determining the radius from a center of the insulating spacer bracket 1000 to the nearest inner contact face 1414*a*. The inner diameter 1500 can be similar to or substantially the same as an outer diameter 515 of the inner pipe 500. In various aspects, the inner diameter 1500 can be termed the "working diameter." The insulating spacer bracket 1000 can also define an outer diameter 1600 similarly to the inner diameter as measured from the outermost contact faces 1414*b*. The outer diameter 1600 in the current aspect can also be defined by the saddles 1200, although in various aspects the saddles 1200 can be located interior to the outer diameter 1600. In various aspects, the standoffs 1100 can be located interior to the outer diameter 1600 such that the outer diameter 1600 can be defined by features of the saddles 1200. In various aspects the outer diameter 1600 can be about similar to or substantially the same as the inner diameter of the outer pipe (not shown).

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A saddle for an insulating support bracket comprising:

an arcuate central portion defining a first end and a second end opposite the first end, at least one vent formed through the arcuate central portion;

a first flange portion bent radially inward from the arcuate central portion at the first end, a first fastener hole formed through the first flange portion, wherein the first fastener hole is accessible through the at least one vent; and a second flange portion bend radially inward from the arcuate central portion at the second end, a second fastener hole formed through the second flange portion, wherein the second fastener hole is accessible through the at least one vent.

2. The saddle of claim 1, wherein:

the first flange portion defines a first flange end distal to the arcuate central portion;

the second flange portion defines a second flange end distal to the arcuate central portion;

the first fastener hole is located closer to the first flange end than to the arcuate central portion; and the second fastener hole is located closer to the second flange end than to the arcuate central portion.

3. The saddle of claim 2, wherein a first fastener engages the first fastener hole and a second fastener engages the second fastener hole.

4. The saddle of claim 1, wherein the at least one vent is elongated in a lateral direction between the first end and the second end of the arcuate central portion.

5. The saddle of claim 4, wherein the at least one vent is substantially pill-shaped.

6. The saddle of claim 1, wherein:

the at least one vent comprises a first vent and a second vent;

the first vent is formed proximate to the first end; and the second vent is formed proximate to the second end.

7. The saddle of claim 6, wherein the first vent is laterally aligned with the second vent.

8. An insulating support bracket comprising:

a plurality of saddles, each saddle comprising an arcuate central portion, a first flange portion extending radially inward from the arcuate central portion, and a second flange portion extending radially inward from the arcuate central portion; and a plurality of standoffs, each standoff being fastened to the first flange portion of a first adjacent one of the saddles and the second flange portion of a second adjacent one of the saddles, wherein each standoff is configured to extend below the first flange portion and the second flange portion a configurable distance as a plurality of standoff protrusions;

wherein an outer diameter of the insulating support bracket is defined by the arcuate central portions of the plurality of saddles and an inner diameter of the insulating support bracket is defined by the plurality of standoff protrusions.

9. The insulating support bracket of claim 8, wherein the first flange portion of each of the saddles is bent radially inward from the arcuate central portion and the second flange portion is bent radially inward relative to the arcuate central portion.

10. The insulating support bracket of claim 9, wherein each of the saddles is formed from a rigid material, and wherein each of the standoffs is formed from a rigid, insulating material.

11. The insulating support bracket of claim 8, wherein each of the standoffs abuts a first outer surface of the first flange portion of the first adjacent one of the saddles and a second outer surface of the second flange portion of the second adjacent one of the saddles.

12. The insulating support bracket of claim 11, wherein each of the first flange portion and the second flange portion of each of the saddles are substantially planar.

13. The insulating support bracket of claim 12, wherein a vent is formed through the arcuate central portion of each of the saddles, and wherein the vent allows access to at least one of the first flange portion and the second flange portion of the saddle.

14. The insulating support bracket of claim 8, wherein the configurable distance is between one-fifth of the height of each of the standoffs to one-half of the height each of the standoffs.

15. An insulating support bracket assembly comprising:

an insulating support bracket comprising:

a plurality of saddles, each saddle comprising an arcuate central portion, a first flange portion extending radially inward from the arcuate central portion and a second flange portion extending radially inward from the arcuate central portion; and a plurality of standoffs, each standoff being disposed between and fastened to an adjacent pair of the saddles, wherein each standoff comprises a standoff protrusion; and a pipe received through the insulating support bracket and defining an outer surface, each of the standoff abutting the outer surface of the pipe;

wherein an arcuate gap is defined between each of the arcuate central portions and the outer surface of the pipe;

wherein each standoff protrusion is configured to extend below the at least one flange portion of each saddle, such that a height of the arcuate gap is configurable based on the height of the standoff protrusion.

16. The insulating support bracket assembly of claim 15, wherein:

each of the standoffs is fastened to the first flange portion of a first adjacent one of the saddles and the second flange portion of a second adjacent one of the saddles.

17. The insulating support bracket assembly of claim 16, wherein each of the standoffs extends radially inward beyond the first flange portion of the first adjacent one of the saddles and the second flange portion of the second adjacent one of the saddles at a configurable distance of between one-fifth the height of each of the standoffs to one-half the height each of the standoffs.

18. The insulating support bracket assembly of claim 17, wherein the first flange portion of each of the saddles is bent radially inward from the arcuate central portion and the second flange portion is bent radially inward relative to the arcuate central portion.

19. The insulating support bracket assembly of claim 16, wherein each of the arcuate gaps extends circumferentially between the first flange portion and the second flange portion of a corresponding one of the saddles.

20. The insulating support bracket assembly of claim 19, wherein vent is formed through the arcuate central portion of each of the saddles, and wherein the vent allow access through the arcuate central portion to a corresponding one of the arcuate gaps.

* * * * *